United States Patent
Baba (10) Patent No.: US 7,418,627 B2
(45) Date of Patent: Aug. 26, 2008

(54) CLUSTER SYSTEM WHEREIN FAILOVER RESET SIGNALS ARE SENT FROM NODES ACCORDING TO THEIR PRIORITY

(75) Inventor: Tsunehiko Baba, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 532 days.

(21) Appl. No.: 11/065,352

(22) Filed: Feb. 25, 2005

(65) Prior Publication Data
US 2005/0289390 A1 Dec. 29, 2005

(30) Foreign Application Priority Data
Jun. 29, 2004 (JP) .............. 2004-190633

(51) Int. Cl.
*G06F 11/00* (2006.01)
(52) U.S. Cl. .............. 714/24; 714/10; 714/23
(58) Field of Classification Search .......... 714/9, 714/10, 12, 13, 15, 23, 24, 55
See application file for complete search history.

(56) References Cited

U.S. PATENT DOCUMENTS

| | | | | |
|---|---|---|---|---|
| 4,639,859 A | * | 1/1987 | Ott ...................... | 710/118 |
| 4,817,091 A | * | 3/1989 | Katzman et al. ............ | 714/8 |
| 5,583,987 A | * | 12/1996 | Kobayashi et al. .......... | 714/11 |
| 6,138,248 A | | 10/2000 | Saito et al. | |
| 6,370,656 B1 | * | 4/2002 | Olarig et al. ................ | 714/23 |
| 6,393,590 B1 | * | 5/2002 | Wood et al. ................. | 714/55 |
| 6,920,580 B1 | * | 7/2005 | Cramer et al. .............. | 714/4 |
| 6,959,344 B2 | * | 10/2005 | Murotani et al. ........... | 710/15 |
| 2003/0212923 A1 | * | 11/2003 | Coppock et al. ........... | 714/24 |
| 2004/0103345 A1 | * | 5/2004 | Dunstan ..................... | 714/24 |

OTHER PUBLICATIONS

"How Cluster Reserves A Disk and Brings A Disk Online", previously published under Q309186, pp. 1-3.

* cited by examiner

*Primary Examiner*—Scott T Baderman
*Assistant Examiner*—Joseph Schell
(74) *Attorney, Agent, or Firm*—Antonelli, Terry, Stout & Kraus, LLP (57) ABSTRACT

A high availability cluster computer system can realize exclusive control of a resource shared between computers and effect failover by resetting a currently-active system computer in case a malfunction occurs in the currently-active system computer. In case a malfunction occurs in a certain system in a cluster, another system in the cluster which has detected the malfunction issues a reset based on a priority to realize failover, in which a standby system takes over the processing of the malfunctioning system when the malfunctioning system is stopped.

8 Claims, 5 Drawing Sheets

| SYSTEM IDENTIFIERS | SYSTEM STATUS | RESET PRIORITY | RESET SIDE IDENTIFIERS | RESET TIMER |
|---|---|---|---|---|
| A | LIVE | 1 | ID_A | NONE |
| B | LIVE | 2 | ID_B | NONE |
| C | DEAD | 3 | ID_C | 10 |
| D | DEAD | 5 | ID_D | 10 |
| E | LIVE | 4 | ID_E | NONE |
| ⋮ | ⋮ | ⋮ | ⋮ | ⋮ |
| Z | LIVE | N | ID_Z | NONE |

CLUSTER SYSTEM WHEREIN FAILOVER RESET SIGNALS ARE SENT FROM NODES ACCORDING TO THEIR PRIORITY

CLAIM OF PRIORITY

The present application claims priority from Japanese application JP 2004-190633, filed on Jun. 29, 2004, the content of which is hereby incorporated by reference into this application.

FIELD OF THE INVENTION

The present invention relates in general to a computer system having a malfunction tolerance capability in an application system; and, more particularly, the present invention relates to a computer system with a program having a failover function, so that in case a malfunction occurs in the program of a computer or an operating system which is running an application, another computer is allowed to takeover the application being run.

BACKGROUND OF THE INVENTION

A computer system which requires high reliability includes a currently-active system computer for executing a process (application) and a standby system computer which is capable of taking over the processing in case a malfunction occurs in the currently-active system. A procedure which is executed from the time of detection of a malfunction occurring in the currently-active system to the time the standby system is caused to take over the processing is provided by a cluster program. When the application uses data on a disk, the disk is shared between the currently-active system and the standby system. In order for the standby system to take over the processing in case a malfunction occurs in the currently-active system, it is necessary to select a standby system from the cluster computers, and, with respect to of resources used by the application and the operating system (OS), to take over the resource, which cannot be used at the same time (shared resource), such as a shared disk and an IP address. In order to realize higher reliability, it is also necessary to ensure that the currently-active system and the standby system do not use the shared resource at the same time, in the case where a malfunction occurs interrupting a path on which the standby system monitors a malfunction of the currently-active system (network split).

A method of selecting a standby system which takes over a process by exclusively taking over a shared disk in a cluster is performed by many cluster programs. As examples, reference is made to the below-listed patent document 1 and non patent document 1.

Patent document 1 describes a technique in which a mechanism for stopping a currently-active system, from a standby system, is used so that the standby system resets the currently-active system for releasing a shared resource owned by the currently-active system, and then the standby system owns the released shared resource for exclusively controlling the shared resource.

The non-patent document 1 describes a technique in which, in the case where a malfunction occurs in a currently-active system so as to perform a failover, a cluster program uses the commands RESERVE and RESET of available SCSI commands to exclusively control an access right to a shared disk. Here, RESERVE is a command for reserving an access right to a disk so that a RESERVE disk reserved by a certain computer denies an access and RESERVE from another computer. RESET is a command for releasing an access right of a disk so as to release an access right of the RESERVE disk.

[Patent document 1] U.S. Pat. No. 6,138,248

[Non-patent document] Microsoft, Support Technical Information, 309186 (online, http://support.microsoft.com/kb/309186/en-us)

In patent document 1, in a cluster computer system, in a case where the standby system cannot monitor the currently-active system, it stops the currently-active system to obtain exclusive control of the shared resource. In a case network split occurs in a cluster of two computers, which constitute each other's standby systems, each of the systems resets the other, so that all of the systems can be reset. The process will be suspended at the time of a network split, so that high availability can not be reached.

Although the standby system resets the currently-active system, the currently-active system will not reset the standby system. When considering a cluster of a currently-active system and two standby systems capable of taking over it (standby systems 1 and 2), in the case of splitting a cluster of two computers of the currently-active system and the standby system 1 from the standby system 2 due to a network split, the standby system 2 resets the currently-active system to perform a failover. When the currently-active system is reset by the standby system 2, the standby system 1 also detects a malfunction of the currently-active system to perform failover. As a result, the standby systems 1 and 2 become currently-active systems at the same time, so as to cause a double access to the shared resource.

In accordance with non-patent document 1, in a cluster computer system, a standby system which cannot monitor the currently-active system includes a process forcefully releasing the control right of the currently-active system to a shared disk by use of the command RESET of the SCSI commands and a process of obtaining the control right of the shared disk released by issuing the RESERVE command of the SCSI commands from an arbitrary standby system. A system which takes over the shared disk, that is, a system which takes over the processing is determined by the two processes. When the latter RESERVE process is invalidated by the former RESET process, excessive failover occurs in such a manner that the process in which a take over is once performed with respect to a certain standby system by the command RESERVE is re-taken over by another standby system. To prevent this, enough time from the former RESET process to the latter RESERVE process is necessary to ensure that all of the standby systems complete the issuance of the RESET command. Irrespective of whether a network split actually occurs, the failover time can be delayed for a fixed time.

In accordance with this method, in a case network split occurs, failover can be performed. A further process for taking over succeeding the shared resource, other than a shared disk, e.g., of taking over an IP address, is necessary. However, the time required for completion of failover is increased so as to delay the failover time.

SUMMARY OF THE INVENTION

The present invention provides a high availability computer system, including an active system (active computer) and standby systems (standby computers) having a function for providing a quick failover. The active /standby computers share at least one resource, and they are combined with a path heartbeat for mutually monitoring each other and with a reset path for mutually stopping computer operations. For example, the shared resource may be a disk drive.

According to a representative embodiment of the present invention, each computer in the high availability computer system is provided with an index (reset priority) for determining the order in which a reset command is issued to other computers. The reset priority has a value uniquely determined in the high availability computer system. For example, the priority may be determined in the order of the IP addresses of the computers. Each computer in a cluster, other than the active computer, sets the delay time for reset issuance based on its own reset priority, in case the computer detects a malfunction in the active computer, based on its detection through the heartbeat path that the heartbeat of the active computer is lost.

A computer whose timer detects the elapse of the set reset delay time issues a reset to the active computer (malfunctioning system) in which a malfunction occurs. The reset delay time set to each computer has a time difference from the reset delay time to be set to the other computers so that more of the computers in the cluster can perform a reset at the same time. Preferably, the time difference between any two computers having an adjacent priority is a fixed time difference that is sufficient for determining whether the reset performed by the prior computer is has successful or failed.

When a certain computer resets a malfunctioning computer, the operation of the malfunctioning computer is stopped to end the use of a shared resource. The process of stopping the operation may be performed by turning off the power or by shut down of the OS.

The computer which has issued a reset (resetting system) communicates the resetting of the malfunctioning system to the other computers. All of the computers which have received a reset notification with regard to the malfunctioning system stop the reset timer before issuing a reset to the malfunctioning computer. This prevents a reset from being performed plural times for the same machine.

After the malfunctioning computer is reset, the standby computer which takes over the processing of the malfunctioning computer takes over the shared resource and the processing which has been performed in the malfunctioning computer.

The standby computer which takes over the processing may be the resetting computer which has reset the malfunctioning system or it may be the other computer identified by the resetting computer.

Thus, a high availability cluster computer system is provided in which the computer having the highest reset priority among normally operating computers inevitably resets a malfunctioning system, and one standby computer including a resetting computer which is able to take over the processing of the malfunctioning computer exists, so that failover to the standby system is performed for taking over the processing.

DETAILED DESCRIPTION OF THE PREFERRED EMBODIMENTS

It is to be understood that the drawings and description related to the present invention have been simplified to show suitable elements for providing a clear understanding of the present invention, and that certain known elements are omitted which do not embody the present invention. This technique includes some conventional elements which should be changed to others which seem to be desirable and/or necessary for implementing the present invention. Those elements, which are known and which cannot facilitate a understanding of the present invention, will not be described here. The accompanying drawings will be described below in detail.

Figure 1:
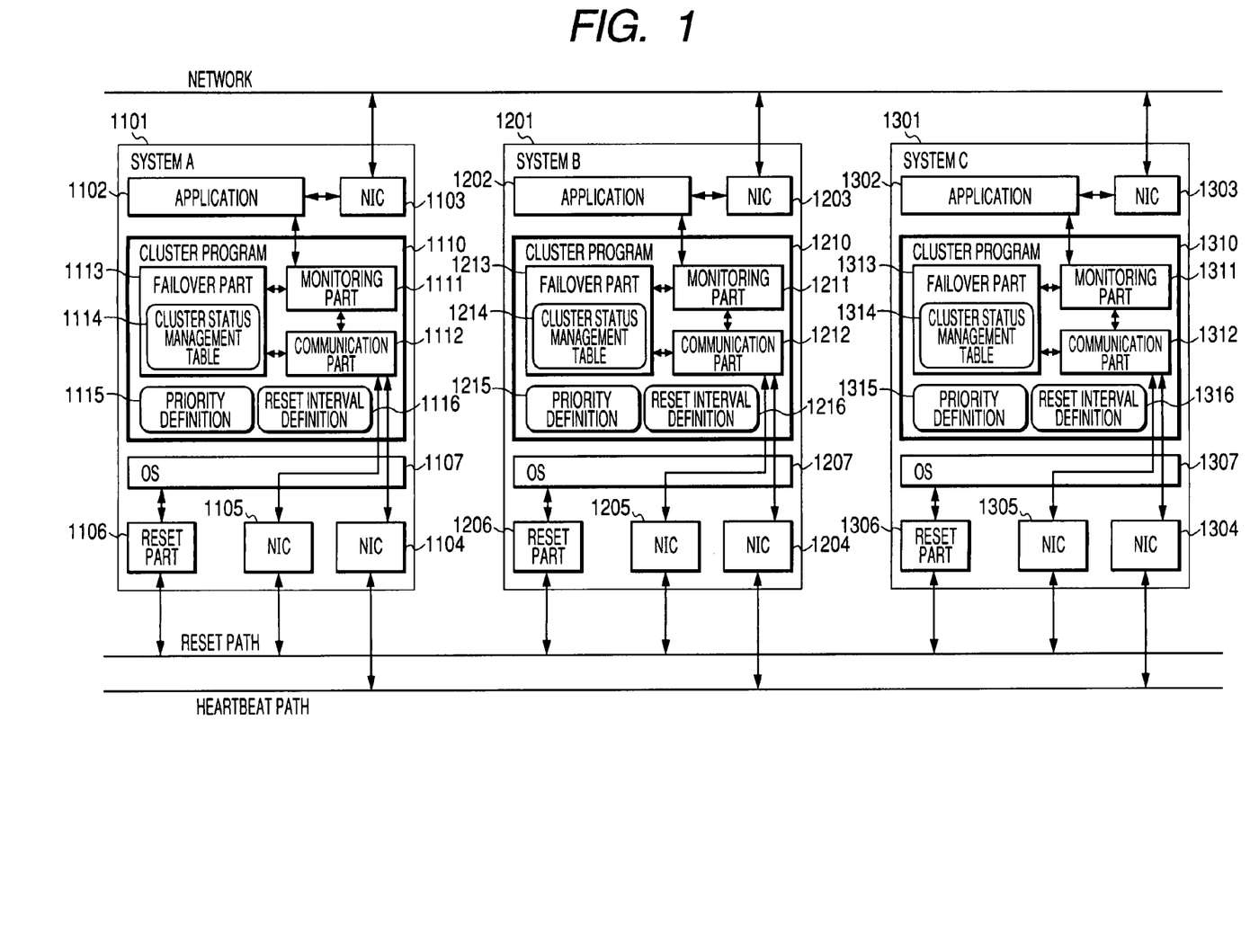
FIG. 1 is a high-order system block diagram of a cluster computer system model in failover according to an embodiment of the present invention.

FIG. 1 shows a system blocks of active/standby computers according to the present invention. For facilitating the description, four-digit numbers are used to identify the programs. For this purpose, the same last two digits appended to the same program are used in common for the active computer and each standby system computer. The thousand's place is expressed as 1 for the active system computer (system A) and is expressed as 2 and 3, respectively, for the standby computers (systems B and C). Each program will be indicated below. The program of each computer is described by the program number on the active computer together with the description of the corresponding program on the standby computer.

In FIG. 1, the system A has, as units for transmitting and receiving a communication with the outside, network adapters (NIC) 1103, 1104, and 1105, and a reset part 1106. It also has, as software programs, an operating system (OS) 1107, an application 1102, and a cluster program 1110.

The NIC 1103 is used to enable the application 1102 to communicate with the outside. The NIC 1104 is used for communication to enable the cluster program 1110 to monitor other computers. The NIC 1105 is used to enable the cluster program 1110 to reset other computers. The NICs 1103 and 1104 are shown as separate elements for facilitating an understanding of the subject matter, but may be the same element.

The reset part 1106 has a function of receiving a reset commend from the cluster programs 1210 and 1310 of the other systems to stop the system A. The function of stopping the system A is realized by application of a forceful stopping to the OS 1107.

The cluster program 1110 has three modules. The cluster program will be described later with reference to FIG. 2.

(1) A monitoring part 1111 has a function of monitoring whether the application program 1102 in the main system is normally operating, and a function of monitoring the status of the cluster programs 1210 and 1310 of the other systems via a communication part 1112.

(2) The communication part 1112 has a function of communicating with the cluster programs 1210 and 1310 of the other systems via the NIC 1104, to effect communication of a reset instruction to reset parts 1206 and 1306 of the other systems in response to a request from the failover part 1113.

(3) The failover part 1113 has a function of instructing a reset via the communication part 1112 to a system in which a malfunction occurs, based on the status of each system as obtained by the monitoring part 1111, and a function of indicating success in effecting reset of the malfunctioning system to the cluster programs 1210 and 1310 of the other systems using the communication part 1112 when a reset is successful. When the computer is a standby system which needs to take over the processing of the malfunctioning system, the failover part 1113 has a function of taking over the processing of the malfunctioning system upon reception of the notification of a reset success of the malfunctioning system received from the cluster programs 1210 and 1310 of the other systems, or upon sending a reset instruction of the main system to the malfunctioning system. The more detailed processes of the cluster programs 1110, 1210, and 1310 will be described later with reference to FIG. 3.

Figure 2:
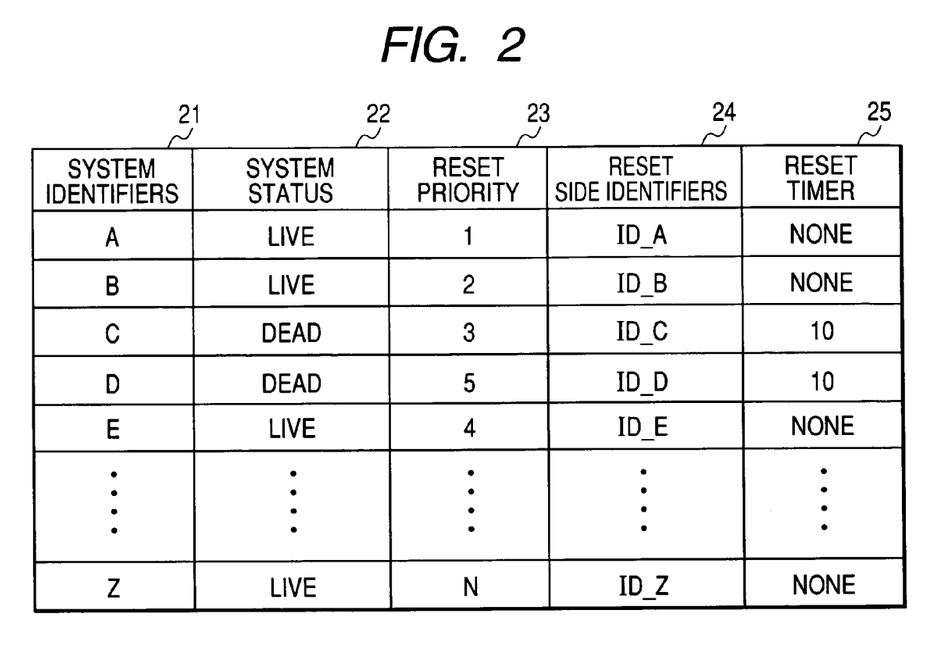
FIG. 2 is a diagram showing the structure of a cluster status management table managed by a cluster program according to an embodiment of the present invention.

The failover part 1113 further has a cluster status management table 1114 for managing the status of a cluster. FIG. 2 shows an example of the cluster status management table according to the present invention. In FIG. 2, the cluster status management table provides five pieces of information:

(1) a system identifier 21 for uniquely identifying each system;
(2) a system status indicator 22 indicating a status monitored by the monitoring part 1111;
(3) a reset priority 23 indicating the order in which each system issues a reset;
(4) a reset side identifier 24 for identifying the reset parts 1206 and 1306 of the other systems on the communicated side of a reset instruction when resetting the other systems; and
(5) a reset timer 25 indicating at what timing reset of each system is instructed.

The delay time (reset delay time) from detection of a malfunctioning system to issuance of a reset instruction from the main system to the malfunctioning system is stored in the reset timer 25. In case a malfunction occurs so that heartbeat detection of the system C is impossible, there is a difference in the reset delay time set to the timers of the systems. The reset delay time in the systems is stored so that the issuance of a reset instruction triggered by plural systems is effected with a time interval. In the present embodiment, specifically, the reset delay time of the systems is stored so that reset is performed in a certain order based on the reset priority 23.

A system with a priority one rank above that of the main system instructs a reset. Over a fixed time difference to ensure that reset is performed, it is possible to ensure that reset is performed in accordance with the reset priority 23. The reset delay time set to the timer of the systems may be set so as to establish a time difference for the systems along system hardware according to the reset priority set to the systems. Reset interval definitions 1116, 1216, and 1316 hold information on the time difference. Alternatively, the reset delay time of the systems may be directly set to the reset interval definitions 1116, 1216, and 1316 by the user.

Figure 5:
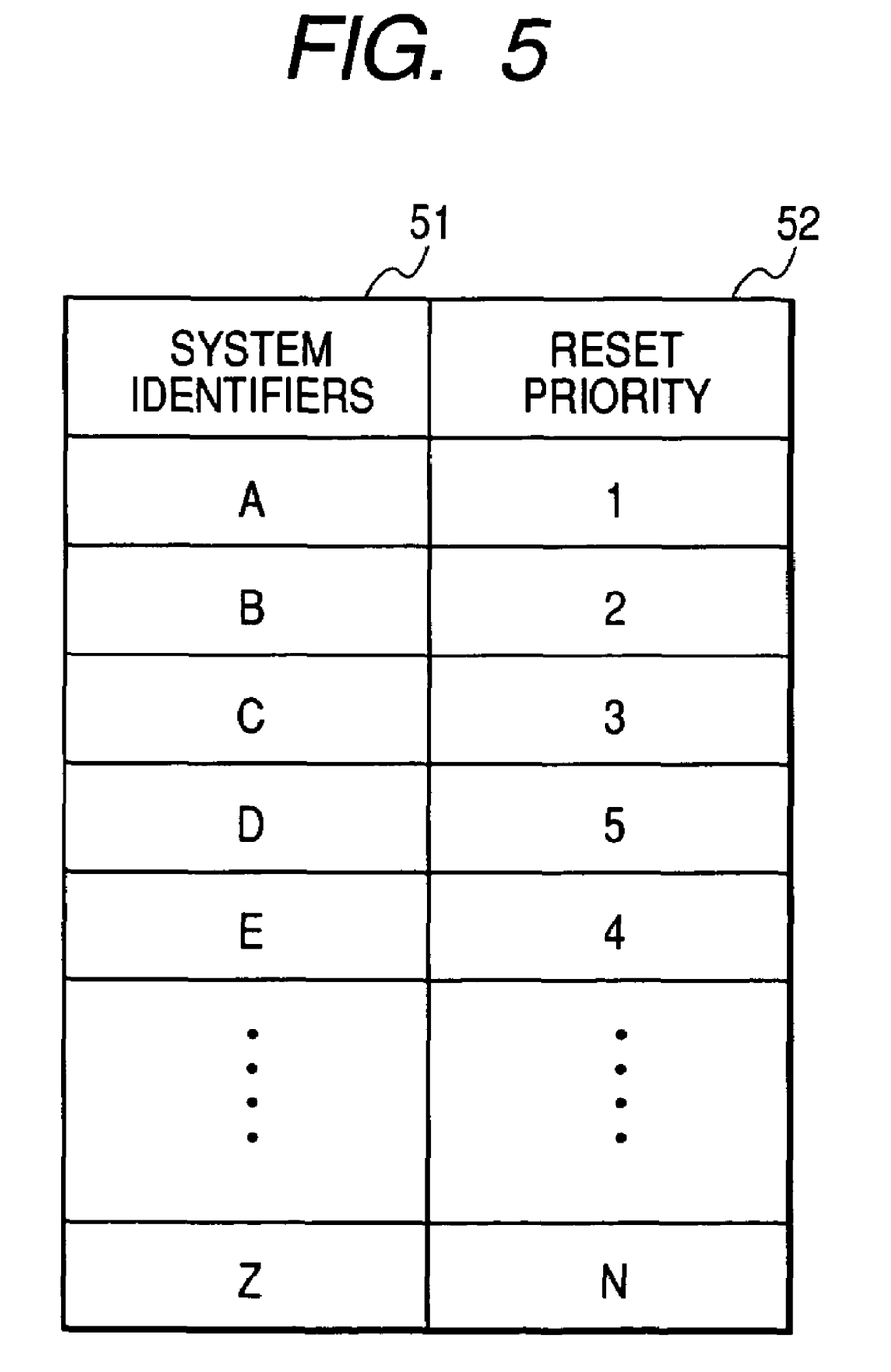
FIG. 5 is a diagram showing the structure of priority definition defining priority in which the cluster program performs reset according to an embodiment of the present invention.

The reset priority 23 may use a value which is not doubled and is uniquely determined in all of the cluster systems. The reset priority 23, which is statically provided by the user, is provided by the priority definition 1115 to the cluster program 1110. FIG. 5 shows the priority definition 1115. The priority definition 1115 includes a system identifier 51 and a reset priority 52. The system identifier 51 may have the same value as that of the system identifier 21 and may have a value uniquely corresponding to the system identifier 21.

The reset priority 52 may have the same value as that of the reset priority identifier 23 and may have a value uniquely determining the reset priority 23 using the reset priority 52. When using an IP address as the reset priority 52, the difference relation is used to uniquely determine the reset priority 23. The user statically provides the reset priority 23 based on the priority definition 1115. A method of dynamically determining the reset priority 23 by the cluster program may also be used. In this case, information included in the priority definition 1115 may be used.

System addition and deletion of information in the status management table 1114 are performed as follows. The cluster program 1110 starts monitoring with the cluster program of a new system using the monitoring part 1111 to add the new system to the table. When the cluster program 1110 resets a malfunctioning system using the failover part 1113, or when the cluster programs of other systems notify the cluster program 1110 that the malfunctioning system is reset, information relating to the malfunctioning system is deleted.

For simplifying the description, this embodiment illustrates an example in which the failover part 1113 has one cluster status management table 1114. However, the information 21 to 25 included in the cluster status management table may be divided into plural tables for management and may be in a cluster program other than the failover part.

Figure 3:
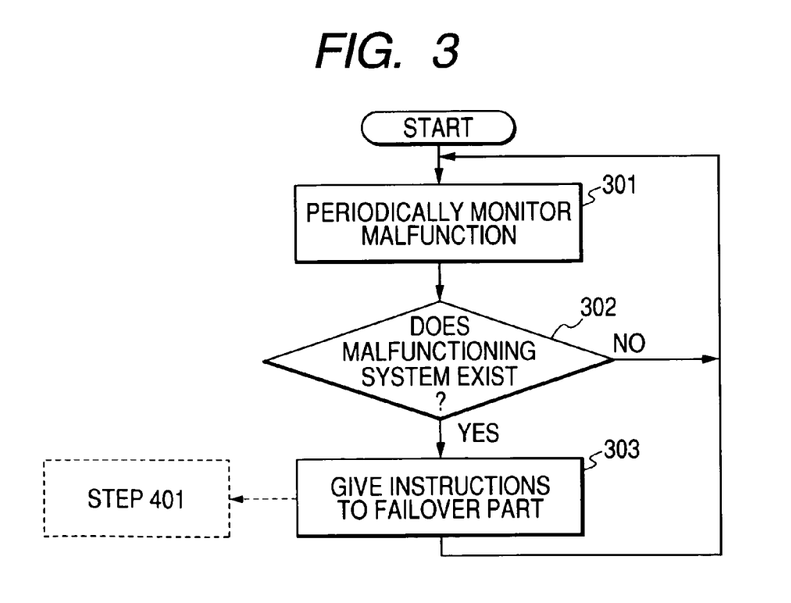
FIG. 3 is a process flowchart of a process performed by the cluster program at the time of monitoring other systems according to an embodiment of the present invention.
Figure 4:
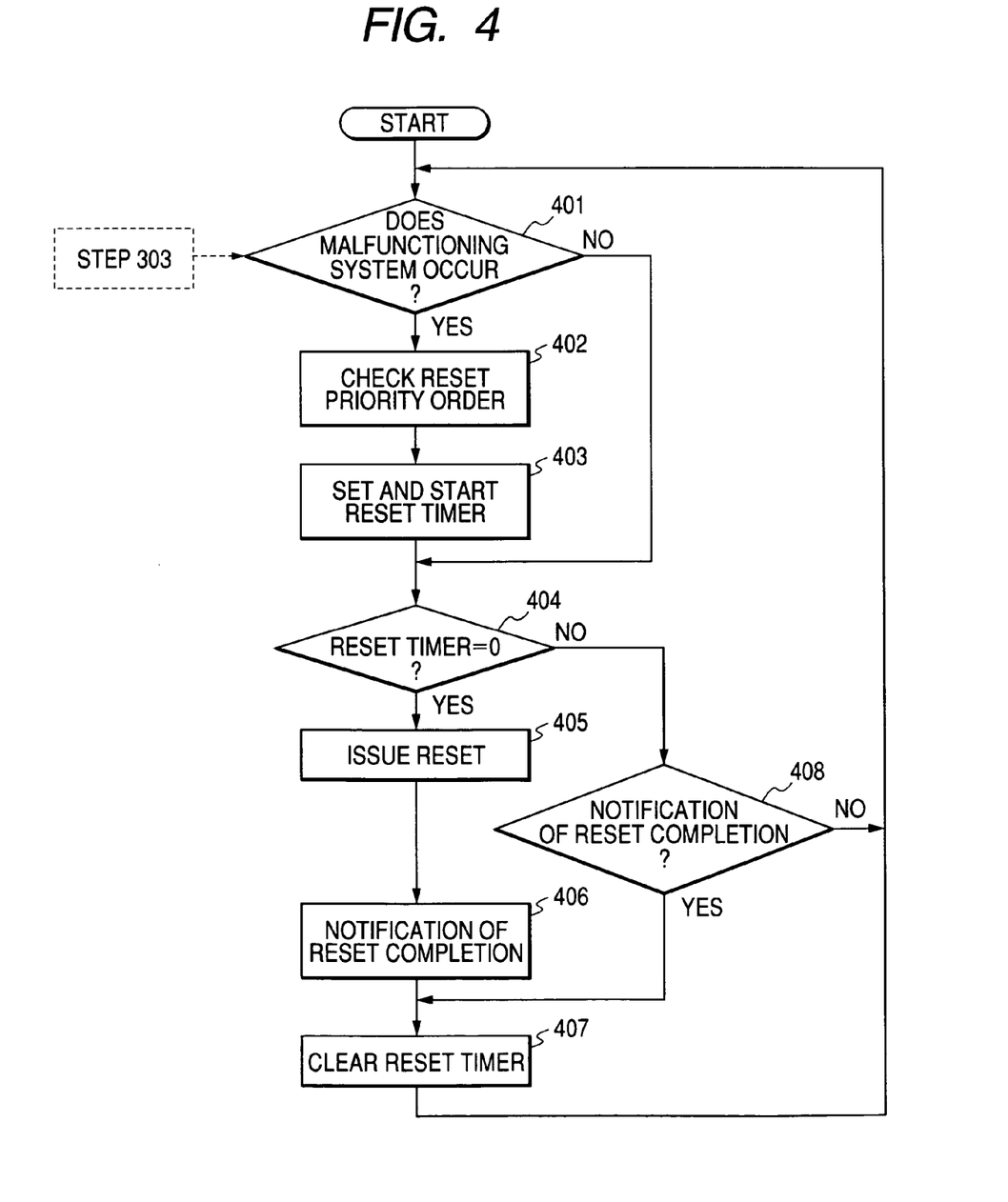
FIG. 4 is a process flowchart of a process in which the cluster program performs failover according to an embodiment of the present invention.

FIGS. 3 and 4 show the flows of the processes of the cluster program according to the present invention, in which FIG. 3 shows the malfunction monitoring operation of the system focusing on the monitoring part 1111, and FIG. 4 shows the failover operation focusing on the failover part 1113. These processes will be described below in detail corresponding to FIGS. 1 and 2.

When executing the cluster program 1110, malfunctions of each other's systems are monitored. The monitoring part 1111 periodically communicates with the cluster programs 1210 and 1310 of the other systems via the communication part 1112 to perform system monitoring of the other systems. The status of each of the systems obtained in step 31 is registered into the system status 22 corresponding to the system identifier 21 in the status management table 1114 (step 301).

The system status 22 of each of the systems obtained in the step 301 is referred to so as to judge whether a system in which a malfunction occurs (malfunction system) exists or not (step 302). When a malfunctioning system does not exist, it is determined that all systems are being normally operated. The routine is returned to the step 301 to periodically continue monitoring. When a malfunctioning system exists, the monitoring part 1111 calls the failover part 1113 (the dotted line in the drawing) to execute step 401 of the failover processing (step 303) The monitoring part 1111 executes the step 303 to return to the step 301 for monitoring the status of the other systems in the cluster again.

The instruction to the failover part, which has been performed in step the 303, is judged in step 401. In the step 401, whether a new malfunctioning system has been detected or not is judged. When a new malfunctioning system exists, the failover part 1113 refers to the reset priority 23 of the management table 1114 (step 402). The time during which the main system resets the malfunctioning system is set to the reset timer 25 of the cluster status management table 1114 based on the reset priority (step 403) so as to perform step 404. In the step 401, when a new malfunctioning system does not exist, the step 404 is performed.

In the step 404, whether the time of the reset timer set in the step 403 has elapsed or not is judged. At the time to issue a reset, a reset instruction is sent via the communication part 1112 from the status management table 1114 to the reset parts 1206 and 1306 of the other systems indicated by the reset side identifier 24 of the system identifier 21 to be reset (step 405).

The reset parts 1206 and 1306, which have received the reset instruction, stop the operation of the main system so as to stop the use of the shared resource. To stop the operation of the main system, the power may be turned off, the software may be reset, the OS may be shut down, or the OS may hang up.

In the step 405, after the reset is successful, the failover part 1113 sends a notification via the communication part 1112 to the cluster programs of other systems that the reset of the malfunctioning system has been performed (step 406). The reset timer 25 of the reset malfunctioning system in the status management table 1114 is cleared (step 407), and the processing returns to the step 401.

In the step 404, when the time of the reset timer set in the step 403 has not elapsed, whether reset completion is performed from other systems or not is judged (step 408). When other systems having a reset priority higher than that of the main system exist, the cluster programs of the other systems precedently execute steps 404 to 407. The malfunctioning system already may have been reset.

When the cluster programs of the other systems indicate a completion of the reset, the reset timer of the reset malfunctioning system is cleared (step 407) so as to not reset the malfunctioning system again, and the processing will return to the step 401.

In step 408, when the cluster programs of the other systems have not indicated reset completion, the malfunctioning system has not been reset, and the processing will to return to the step 401 without performing any process.

Figure 6:
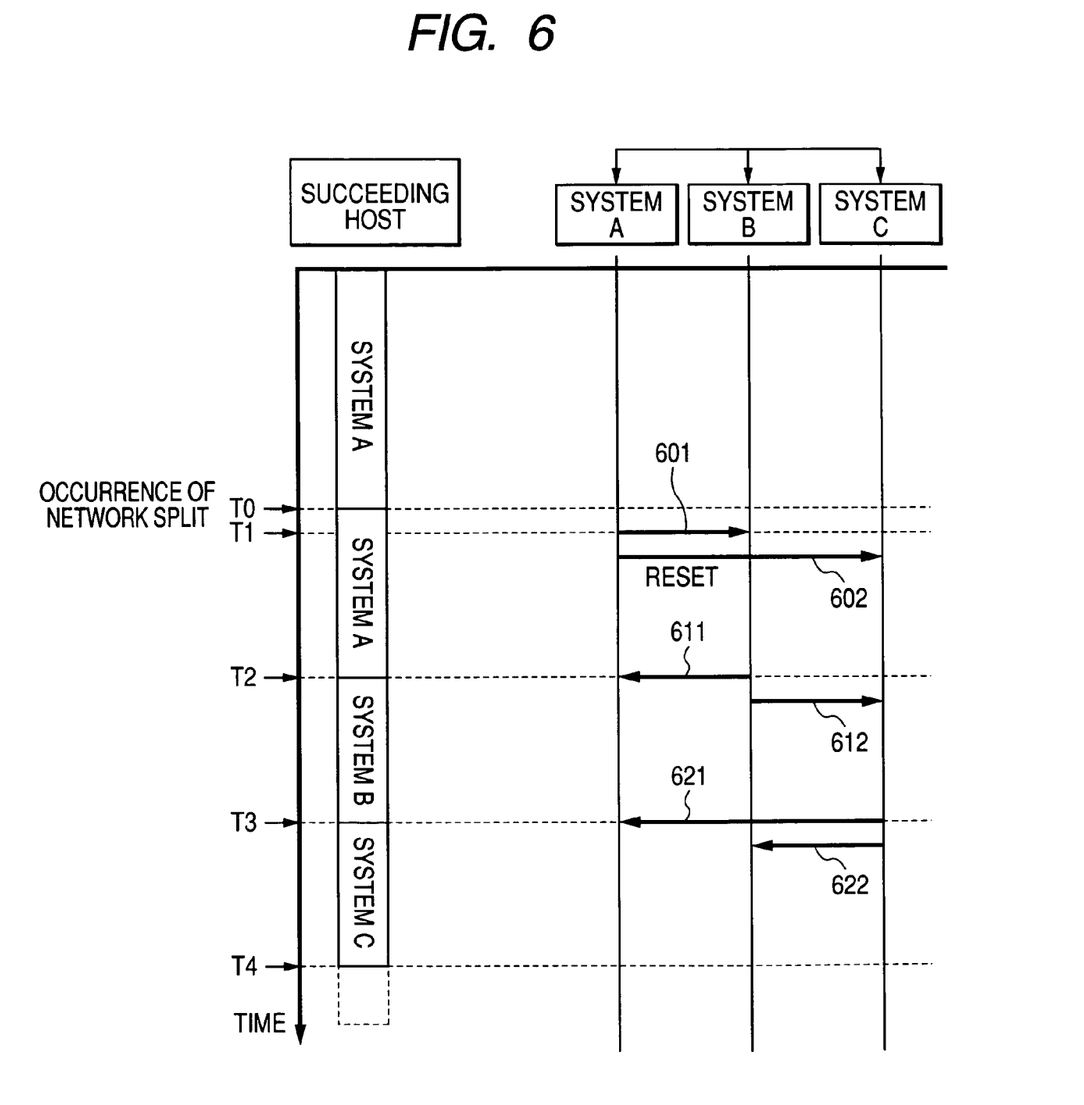
FIG. 6 is a sequence diagram of the tithing at which the cluster program performs reset according to an embodiment of the present invention.

FIG. 6 is a diagram showing the timing at which a reset realized by the present invention is performed. The vertical axis of FIG. 6 indicates the lapse of time and a reset process with time elapse. The left side of FIG. 6 indicates the owner of a shared resource, that is, which system is an active system. The right side of FIG. 6 indicates a reset process in each system.

For simplifying the description, FIG. 6 shows a case in which a network split occurs in a cluster of three computers consisting of the systems A, B, and C in descending order of reset priority.

When a network split occurs at time T0, times T1, T2, and T3 are set to the reset timers of the systems A, B, and C, respectively, based on the reset priority. When the systems are normal, reset is performed to a malfunctioning system, as seen from its own computer at the set time.

When the systems B and C malfunction, as seen from the system A, the system A resets them at the time T1 (arrows 601 and 602). In case malfunctions which cannot be reset by the system A occur at the same time, the system B performs a reset at the time T2 (arrows 611 and 612). In case a malfunction which cannot be reset by the system B occurs, the system C performs reset at the time T3 (arrows 621 and 622). The system A owns the shared resource at the time T0 to T2. The system B owns the shared resource at the time T2 to T3. The system C owns the shared resource at the time T3 to T4. Failover is thus performed. After the time T4, the reset path cannot be normal, which is not targeted in the present invention. According to the above-described embodiment of the present invention, the following effects are provided.

In a high availability cluster computer system having a reset path so that, in case the heartbeat for the system monitoring is lost, the malfunctioning system is reset in accordance with the reset priority. This ensures that only systems in a cluster, in which the system which has performed a reset, use the shared resource. Failover can be realized at the time of a network split.

The user statically defines the priority definition to the cluster program. It is possible to realize failover to freely set the reset priority to control the side subject to failover.

The user defines a reset interval to the cluster program to control reset the timing.

According to the present invention, when an active system computer cannot be monitored, failover can be realized to a cluster in which a system having high reset priority exists. Quick failover is thus possible. It is expected that the present invention can be widely embodied as a high availability computer system.

What is claimed is:

1. A failover method for a cluster computer system in which a plurality of computers sharing a resource are connected by a heartbeat path for providing each computer with lines for monitoring operations of the other computers and a reset path for providing each computer with lines for stopping other computers, whereby, when one of said plurality of computers operating as an executing system executes a process using said shared resource, exclusive control of said shared resource is performed so that other computers in the cluster computer systems function as standby systems with respect to said one computer, wherein each of the computers performs a procedure including:

a first step of registering a priority for resetting other computers, which is uniquely established among the computers in the cluster computer system;

a second step of setting a reset delay time upon which to issue a reset to one of said other computers based on said priority, in a case of detecting an occurrence of a malfunction in said one of said other computers based on a loss of a heartbeat under monitoring;

a third step of resetting a malfunctioning computer when the reset delay time set in said second step has elapsed;

a fourth step of notifying reset completion of the malfunctioning computer to still other computers in the cluster computer system; and a fifth step of invalidating timing of said reset delay time to stop issuing a reset to the malfunctioning computer when receiving a notification of reset completion of the malfunctioning computer from one of said still other computers earlier than the elapse of said reset delay time.

2. The failover method according to claim 1, wherein each of the computers registers the length of said reset delay time for issuing a reset to any of the other computers as a measure of said priority in said first step.

3. The failover method according to claim 1, wherein each of the computers registers priority upon reception of a specification of an order for resetting any of the other computers among the computers in the cluster computer system.

4. The failover method according to claim 1, wherein a computer which has executed said third step takes over the processing of said malfunctioning computer.

5. The failover method according to claim 1, wherein each of the computers further perform a sixth step of selecting a standby computer to take over the processing of a malfunctioning computer so that the computer selected by said sixth step takes over the processing of the malfunctioning computer upon reception of the notification of reset completion of said malfunctioning computer.

6. A cluster computer system which has a plurality of computers sharing a predetermined memory resource and is connected by a heartbeat path for providing each computer with lines for monitoring operations of other computers and a reset path providing each computer with lines for stopping the other computers,
wherein a priority for resetting the other computers is uniquely established for each of said computers among said plurality of computers in the cluster computer system,
wherein each of the computers has:
means for setting, to a timer, a reset delay time determined in accordance with the value of the priority established to that computer, when detecting an occurrence of malfunction of an active computer via said heartbeat path;
means for stopping said timer upon notification of reset completion of the active computer;
means for instructing a reset to said active computer in which a malfunctioning occurs on condition that said timer detects that said reset delay time has elapsed and for communicating the reset completion to the other computers; and
means for forcefully stopping itself when instructed to reset from one of the other computers.

7. The cluster computer system according to claim 6, wherein each of the computers further has an interface for setting said reset delay time.

8. The cluster computer system according to claim 6, wherein each of the computers has means for setting said value of the priority upon reception of a specification of an order for resetting other computers among the computers, and means for determining said reset delay time from a predetermined reset time interval and said value of the priority.

* * * * *